United States Patent
Hashimoto et al.

(10) Patent No.: US 10,324,615 B2
(45) Date of Patent: Jun. 18, 2019

(54) COMPUTING DEVICE AND BROWSER FOR SAME

(71) Applicant: Nintendo Co., Ltd., Kyoto (JP)

(72) Inventors: Hideyuki Hashimoto, Kyoto (JP); Shigetoshi Kitayama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 478 days.

(21) Appl. No.: 14/548,103

(22) Filed: Nov. 19, 2014

(65) Prior Publication Data

US 2015/0082147 A1    Mar. 19, 2015

Related U.S. Application Data

(63) Continuation of application No. 13/355,545, filed on Jan. 22, 2012, now abandoned, which is a
(Continued)

(51) Int. Cl.
*G06F 3/0481* (2013.01)
*G06F 3/0488* (2013.01)
(Continued)

(52) U.S. Cl.
CPC ............ *G06F 3/0488* (2013.01); *G06F 3/041* (2013.01); *G06F 3/0482* (2013.01);
(Continued)

(58) Field of Classification Search
CPC ....... G06F 17/2235; G06F 2203/04803; G06F 2203/04806; G06F 2203/04808;
(Continued)

(56) References Cited

U.S. PATENT DOCUMENTS

| 4,751,669 A | 6/1988 | Sturgis et al. |
| 4,873,662 A | 10/1989 | Sargent |

(Continued)

FOREIGN PATENT DOCUMENTS

| JP | 05-127819 | 5/1993 |
| JP | 07-294892 | 11/1995 |

(Continued)

OTHER PUBLICATIONS

Notice of Allowance and Fee(s) Due and Notice of Allowability dated Mar. 12, 2015 in U.S. Appl. No. 14/548,080.
(Continued)

*Primary Examiner* — Viet D Pham
(74) *Attorney, Agent, or Firm* — Nixon & Vanderhye, P.C.

(57) ABSTRACT

An example computing device includes a touch screen display; wireless communication circuitry; one or more processors; and memory for storing a browser program for displaying web pages on the touch screen display. The one or more processors are configured to execute the browser program to control the computing device to at least: display, on the touch screen display, web pages accessed via the wireless communication circuitry; receive either a first input or a second input to the touch screen, wherein the second input is different from the first input and an initial touch on the touch screen for the first input and for the second input is a link on the displayed web page; in response to the first input, perform a first operation; and in response to the second input, perform a second operation, different from the first operation.

46 Claims, 15 Drawing Sheets

Related U.S. Application Data continuation of application No. 11/253,793, filed on Oct. 20, 2005, now Pat. No. 8,169,410.

(60) Provisional application No. 60/619,952, filed on Oct. 20, 2004.

(51) Int. Cl.
| | | |
|---|---|---|
| *G06F 3/041* | (2006.01) | |
| *G06F 3/0482* | (2013.01) | |
| *G06F 3/0484* | (2013.01) | |
| *G06F 3/0485* | (2013.01) | |
| *G06F 17/22* | (2006.01) | |

(52) U.S. Cl.
CPC ........ *G06F 3/0485* (2013.01); *G06F 3/04817* (2013.01); *G06F 3/04842* (2013.01); *G06F 3/04845* (2013.01); *G06F 3/04883* (2013.01); *G06F 17/2235* (2013.01); *G06F 17/2247* (2013.01); *A63F 2300/1075* (2013.01); *A63F 2300/301* (2013.01); *G06F 2203/04803* (2013.01); *G06F 2203/04806* (2013.01); *G06F 2203/04808* (2013.01)

(58) Field of Classification Search
CPC .... G06F 3/041; G06F 3/04817; G06F 3/0482; G06F 3/04842; G06F 3/0485; G06F 3/0488; G06F 3/04883
See application file for complete search history.

(56) References Cited

U.S. PATENT DOCUMENTS

| | | |
|---|---|---|
| 5,166,666 A | 11/1992 | Tanaka |
| 5,252,951 A | 10/1993 | Tannenbaum et al. |
| 5,347,477 A | 9/1994 | Lee |
| 5,463,725 A | 10/1995 | Henckel et al. |
| 5,467,102 A | 11/1995 | Kuno et al. |
| 5,471,578 A | 11/1995 | Moran et al. |
| 5,564,005 A | 10/1996 | Weber et al. |
| 5,592,607 A | 1/1997 | Weber et al. |
| 5,612,719 A | 3/1997 | Beernink et al. |
| 5,694,162 A | 12/1997 | Freeny, Jr. |
| 5,717,939 A | 2/1998 | Bricklin et al. |
| 5,809,267 A | 9/1998 | Moran et al. |
| 5,847,698 A | 12/1998 | Reavey et al. |
| 5,880,743 A | 3/1999 | Moran et al. |
| 5,893,132 A | 4/1999 | Huffman et al. |
| 5,900,848 A | 5/1999 | Haneda et al. |
| 5,990,893 A | 11/1999 | Numazaki |
| 6,020,881 A | 2/2000 | Naughton et al. |
| 6,037,937 A | 3/2000 | Beaton et al. |
| 6,057,845 A | 5/2000 | Dupouy |
| 6,088,731 A | 7/2000 | Kiraly et al. |
| 6,133,916 A * | 10/2000 | Bukszar ................ G06F 17/211 715/744 |
| 6,249,606 B1 | 6/2001 | Kiraly et al. |
| 6,297,945 B1 | 10/2001 | Yamamoto |
| 6,313,853 B1 | 11/2001 | Lamontagne et al. |
| 6,331,840 B1 | 12/2001 | Nielson et al. |
| 6,396,523 B1 | 5/2002 | Segal et al. |
| 6,442,578 B1 | 8/2002 | Forcier |
| 6,486,895 B1 | 11/2002 | Robertson et al. |
| 6,525,749 B1 | 2/2003 | Moran et al. |
| 6,545,669 B1 | 4/2003 | Kinawi et al. |
| 6,639,584 B1 | 10/2003 | Li |
| 6,725,203 B1 | 4/2004 | Seet et al. |
| 6,735,632 B1 | 5/2004 | Kiraly et al. |
| 6,765,557 B1 | 7/2004 | Segal et al. |
| 6,859,909 B1 | 2/2005 | Lerner et al. |
| 7,084,859 B1 | 8/2006 | Pryor |
| 7,221,330 B2 | 5/2007 | Finke-Anlauff |
| 7,489,303 B1 | 2/2009 | Pryor |
| 7,573,462 B2 | 8/2009 | Ouchi |
| 7,750,893 B2 | 7/2010 | Hashimoto et al. |
| 8,089,423 B1 | 1/2012 | Harris |
| 8,169,410 B2 | 5/2012 | Hashimoto et al. |
| 9,052,816 B2 | 6/2015 | Hashimoto et al. |
| 2001/0035860 A1 | 11/2001 | Segal et al. |
| 2001/0045949 A1 | 11/2001 | Chithambaram et al. |
| 2002/0015064 A1 | 2/2002 | Robotham et al. |
| 2002/0033795 A1 | 3/2002 | Shahoian et al. |
| 2002/0097229 A1 | 7/2002 | Rose et al. |
| 2002/0151283 A1* | 10/2002 | Pallakoff .................. G06F 3/14 455/575.1 |
| 2002/0158812 A1* | 10/2002 | Pallakoff ............... G06F 1/1616 345/1.1 |
| 2002/0163545 A1* | 11/2002 | Hii ...................... G06F 3/04817 715/835 |
| 2003/0048250 A1 | 3/2003 | Boon et al. |
| 2003/0156145 A1 | 8/2003 | Hullender et al. |
| 2003/0197744 A1 | 10/2003 | Irvine |
| 2003/0222917 A1 | 12/2003 | Trantow |
| 2003/0227423 A1 | 12/2003 | Arai et al. |
| 2004/0138792 A1* | 7/2004 | Foxford ................. G06Q 10/08 701/33.4 |
| 2004/0141649 A1 | 7/2004 | Landstad et al. |
| 2004/0145574 A1 | 7/2004 | Xin et al. |
| 2004/0169683 A1 | 9/2004 | Chiu et al. |
| 2004/0174399 A1 | 9/2004 | Wu et al. |
| 2005/0012723 A1* | 1/2005 | Pallakoff ............... G06F 1/1616 345/173 |
| 2005/0064936 A1 | 3/2005 | Pryor |
| 2006/0010400 A1 | 1/2006 | Dehlin et al. |
| 2006/0026521 A1 | 2/2006 | Hotelling et al. |
| 2006/0036955 A1 | 2/2006 | Baudisch et al. |
| 2006/0101354 A1 | 5/2006 | Hashimoto et al. |
| 2012/0124491 A1 | 5/2012 | Hashimoto et al. |

FOREIGN PATENT DOCUMENTS

| | | |
|---|---|---|
| JP | 08-076926 | 3/1996 |
| JP | 2000-010655 | 1/2000 |
| JP | 2000-163193 | 6/2000 |
| JP | 3095145 | 8/2000 |
| JP | 2001-005438 | 1/2001 |
| JP | 2002-091688 | 3/2002 |
| WO | 00/34942 | 6/2000 |

OTHER PUBLICATIONS

Office Action dated Jan. 16, 2015 in U.S. Appl. No. 14/548,080.
Willey, "Design and Implementation of a Stroke Interface Library", Internet Article, Mar. 24, 1997, 6 pages, IEEE Region 4 Student Paper Contest, http://citeseer.ist.psu.edu/cache/papers/cs/24072/http:zSzzSzwww.etla.netzSzlibstrokezSzlibstroke.pdf/willey97design.pdf.
Worth, "xstroke: Full-screen Gesture Recognition for X", Proceedings of the Freenix Track: 2003 Usenix Annual Technical Conference, Jun. 9, 2003, pp. 187-196, http://www.usenix.org/events/usenix03/tech/freenix03/full_papers/worth/worth.pdf.
Moyle et al., "A Flick in the Right Direction: An Evaluation of Simple Gesture Based Controls", Nov. 2, 2001, 47 pages.
Motion Gestures in Opera (downloaded from internet on Mar. 15, 2005 at http://www.opera.com/features/mouse/).
Opera FAQ (downloaded from internet on Mar. 15, 2005 at http://www.opera.com/features/mouse/).
English-language machine translation of JP 05-127819.
English-language machine translation of JP 07-294892.
English-language machine translation of JP 08-076926.
English-language machine translation of JP 2000-010655.
English-language machine translation of JP 2000-163193.
English-language machine translation of JP 2001-005438.
English-language machine translation of JP 2002-091688.
"Avant Browser Help—Mouse Gestures," http://www.avantbrowser.com (1999-2000).
Hansen, Evan, "Building a better computer mouse," http://news.com (Oct. 2, 2004).
"Mouse Gestures," http://mozdev.org (Oct. 27, 2004).

(56) References Cited

OTHER PUBLICATIONS

Todd, Christopher, "Mouse gestures @ Penn State Physics," www.phys.psu.edu (2003).
Christodd, "Mouse Gestures—Controlled by Motion," www.bitesizeinc.net (Dec. 10, 2003).
"Mouse Gestures for Internet Explorer—The Gestures," www.ysgyfarnog.co.uk.
"Mouse Gestures in Opera," http://www.opera.com.
"Deepnet Explorer, Quick Tour, 5. Mouse Gestures," http://www.deepnetexplorer.com (2004).
Buxton, William A.S., "Two-Handed Document Navigation," Xerox Disclosure Journal, 19(2), Mar./Apr. 1994, 103-108, www.billbuxton.com.

* cited by examiner

COMPUTING DEVICE AND BROWSER FOR SAME

CROSS-REFERENCE TO RELATED APPLICATIONS

This application is a continuation of application Ser. No. 13/355,545, filed Jan. 22, 2012, which is a continuation of application Ser. No. 11/253,793, filed Oct. 20, 2005, now U.S. Pat. No. 8,169,410, which claims the benefit of provisional Application No. 60/619,952, filed Oct. 20, 2004. The contents of each of these applications are incorporated herein in their entirety.

BACKGROUND AND SUMMARY

This application generally describes applications (such as a web browser) for use on a portable display device including, but not limited to, such a device that include a touch-sensitive display screen.

The popularity of portable devices such as mobile telephones and handheld computing devices such as personal digital assistants (PDAs) continues to increase. These devices generally have a wide variety of capabilities that may include voice communications, electronic mail, calendars, storing contact information and the like. Many of these portable devices offer internet access for web browsing. However, such web browsing is often unsatisfactory because the portable devices generally have small screen sizes and a limited user interface. Such screen size and user interface limitations can also adversely affect the usability of other applications running on the portable devices.

The present application describes an application (such as a web browser) for a portable display device to which inputs are provided using various gestures on a touch-sensitive surface. In a particular, non-limiting example implementation, the portable display device includes two different display screens, at least one of which is a touch screen. By using gestures input to this touch screen, a user can browse the web and control the display of web content on the screen(s) of the portable display device. The gesture inputs may also be used to provide inputs to other applications running on the portable display device.

In addition, the present application also describes a system including a first display screen and a touch-sensitive, second display screen physically separate from the first display screen. A processor is configured to generate respective images for both the first and second display screens, wherein the processor is further configured to interchange images on the first and second display screens in response to a gesture supplied to the touch-sensitive, second display screen.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION OF EXAMPLE EMBODIMENTS

Figure 1:
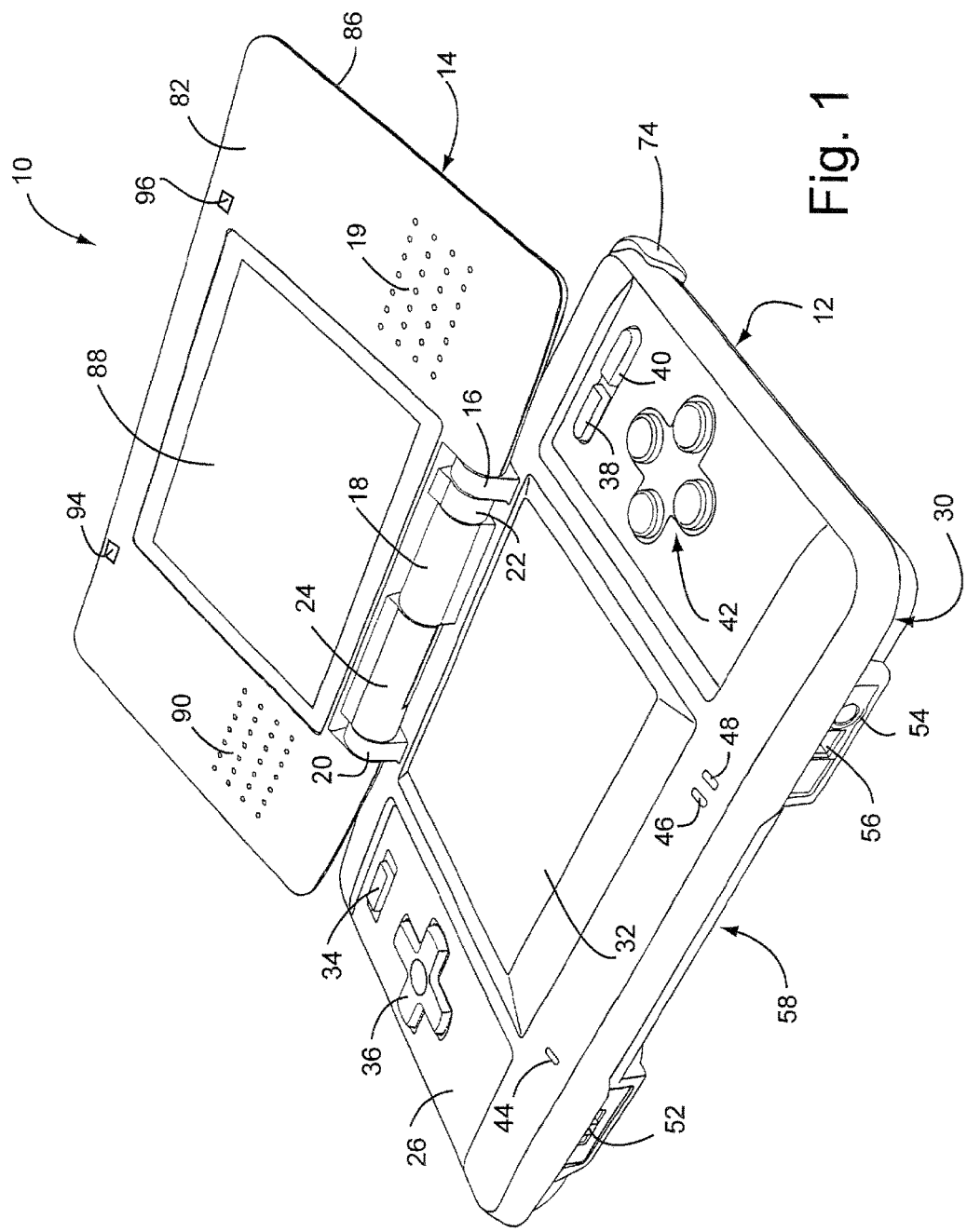
FIG. 1 is a perspective view of an example portable display device on which the browser described herein may be used, the device being shown in an open, ready-to-use orientation.
Figure 2:
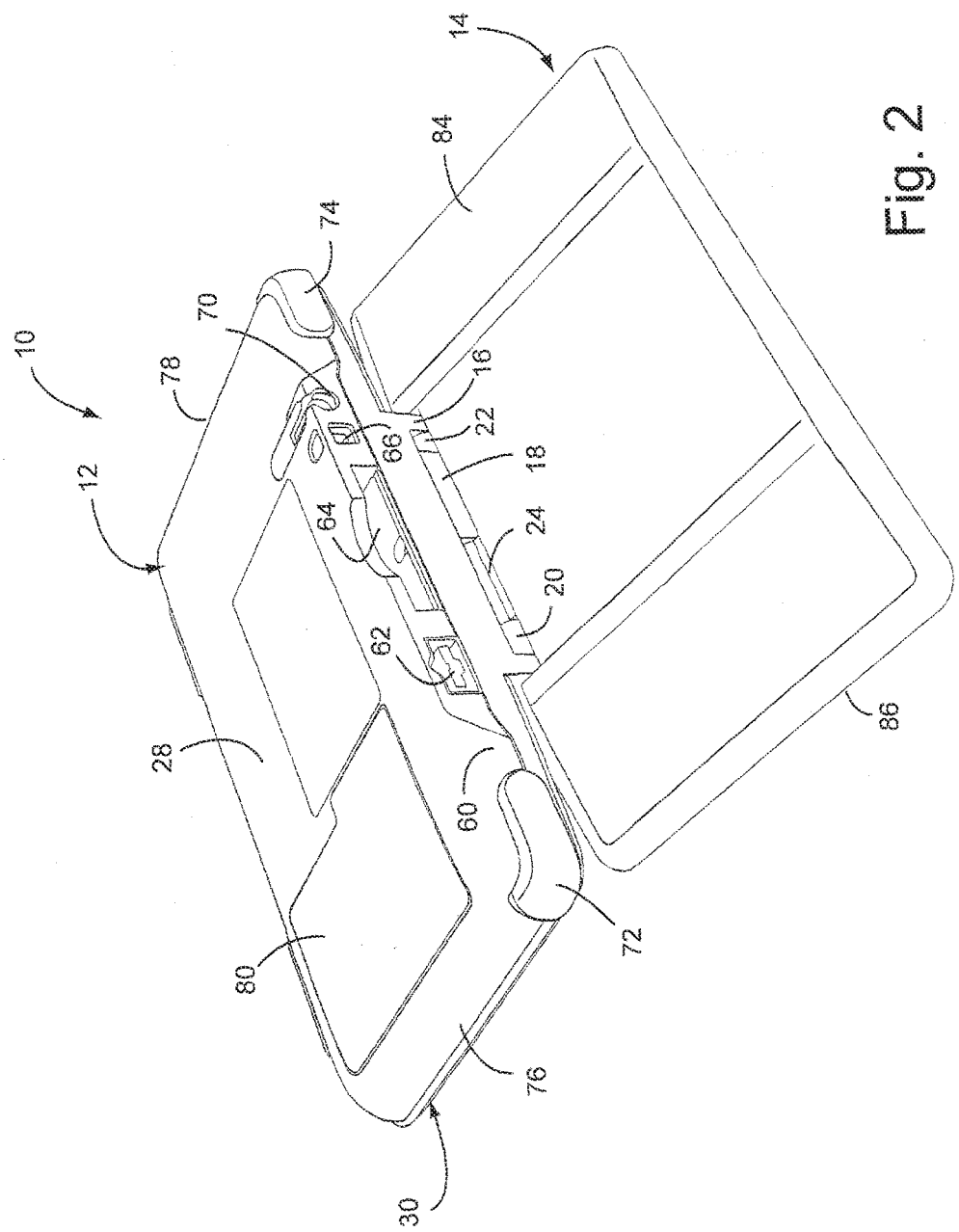
FIG. 2 is an inverted perspective view of the portable display device shown in FIG. 1.

Referring to FIGS. 1 and 2, in an illustrative example embodiment the portable display device is a game device or console 10 that includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 2) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus, described further herein. A power button 34 is located in the upper left corner of face 26 and is used to turn the game device 10 on and off. A cross-shaped directional control button 36 is located adjacent and below the power button 34, and is used for game play control.

Figures 6A, 6B:
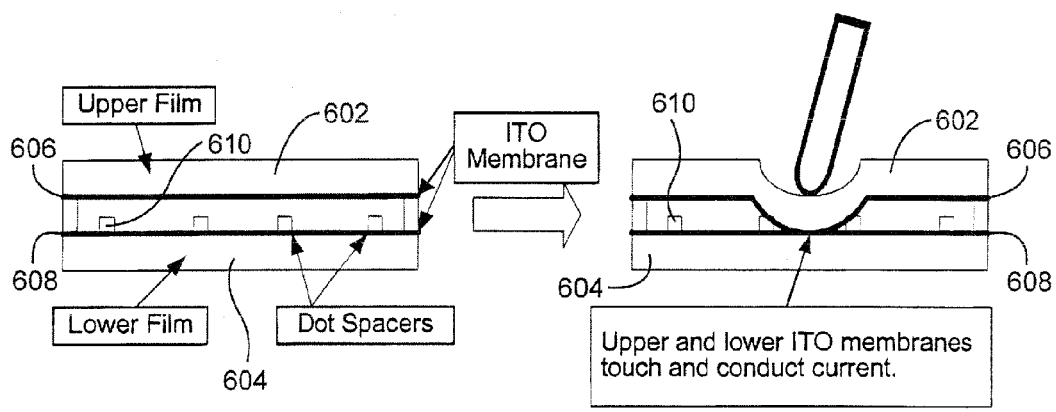
FIGS. 6(A) and 6(B) shown an example of a touch panel display structure usable for the example portable display device of FIGS. 1-4.

More specifically, display screen 32 includes a resistive-membrane touch panel that allows coordinates to be obtained in dot units. The touch panel can be operated with a finger or a stylus. The touch panel input data includes x-coordinate (8 bits); y-coordinate (8 bits); touch determination flag (1 bit); and data validity flag (2 bits). In the example portable game system, the touch panel must be pressed down with a force that exceeds a specified value, e.g., 80 g, for the location to be detected. The details of the input data for the touch panel are shown below:

x-coordinate, y-coordinate
x-coordinate: 0-255 (dots)
y-coordinate: 0-191 (dots)
touch determination flag
0: the touch panel is not being touched
1: the touch panel is being touched
data validity flag
00: both the x-coordinate and y-coordinate are valid
01: the x-coordinate is invalid
10: the y-coordinate is invalid
11: both the x-coordinate and y-coordinate are invalid FIGS. 6(A) and 6(B) show an example touch panel structure which includes an upper film 602, a lower film 604, transparent conducting membranes 606, 608 and dot spacers 610. As shown in FIG. 6(A), normally, the space formed between the upper and lower films 602, 604, each of which is respectively coated with a transparent conducting membrane 606, 608 (such as an indium-tin-oxide membrane), prevents current from being conducted. When a finger or stylus presses on the panel as shown in FIG. 6(B), the pressure causes the upper and lower films to touch and conduct current. The dot spacers 610 prevent erroneous input and the example portable game system from being continuously on.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

Figure 3:
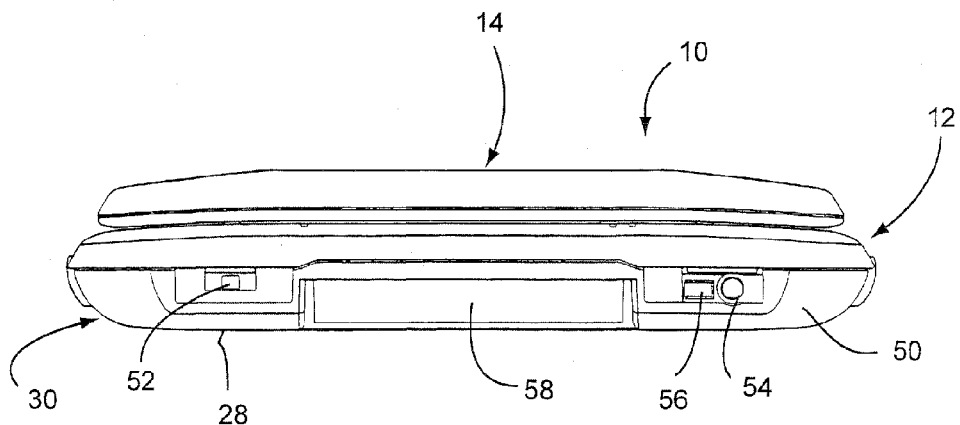
FIG. 3 is a front elevational view of the portable display device shown in FIG. 1, but with the device shown in a closed position.
Figure 4:
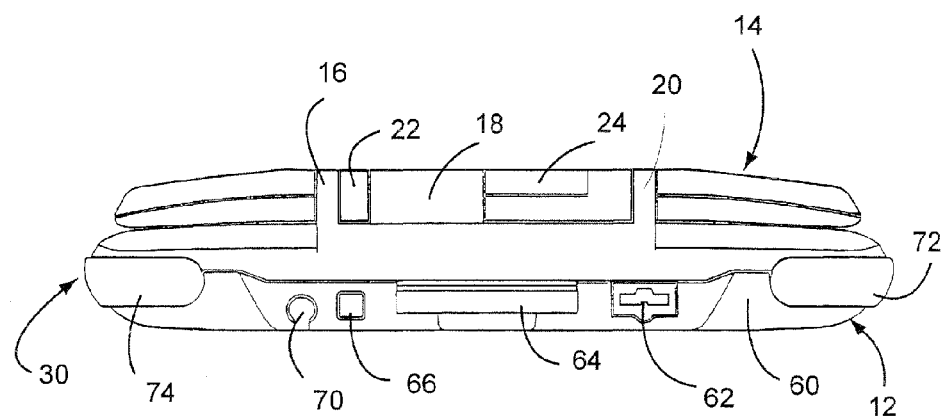
FIG. 4 is a rear elevational view of the portable display device shown in FIG. 3.

With reference now especially to FIG. 3, a lower or forward portion 50 of the peripheral edge 30 (closest to the user) is provided with a volume control slide 52 and headphone and microphone connectors 54, 56 on either side of a first game slot 58. Slot 58 is especially designed for larger game cartridges or cards originally designed for use with the assignee's Game Boy Advance® game system.

Figure 5:
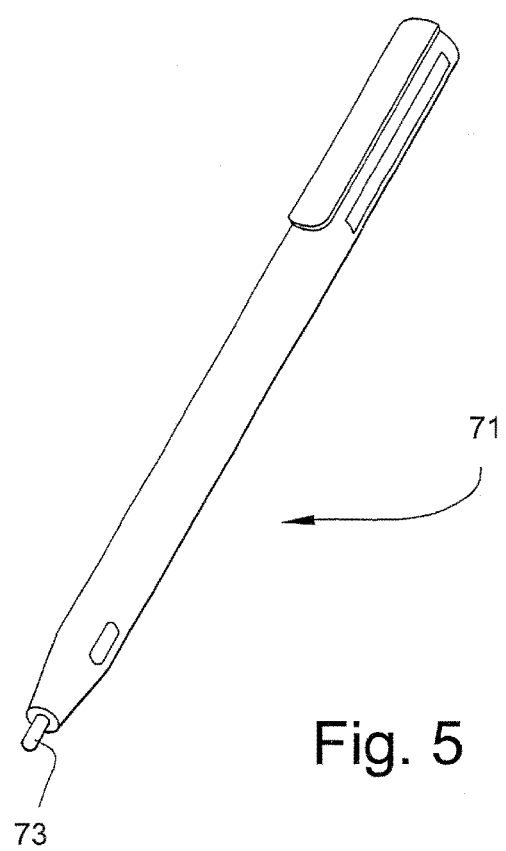
FIG. 5 is a perspective view of a stylus for use with the portable display device of FIGS. 1-4.

As best seen in FIG. 2, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this game device. The second game slot 64 is smaller than the first game slot 58, reflecting the different sizes of the game cards. Openings 66, 68 form an elbow-shaped through-slot adapted for securing a wrist strap (not shown), thereby enabling the user to secure the game device to the body and thus minimize the potential for losing or misplacing the game. A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 82 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body. In this example, screen 88 is not touch-sensitive, although it will be recognized that such a feature may be easily provided if desired.

Figure 7:
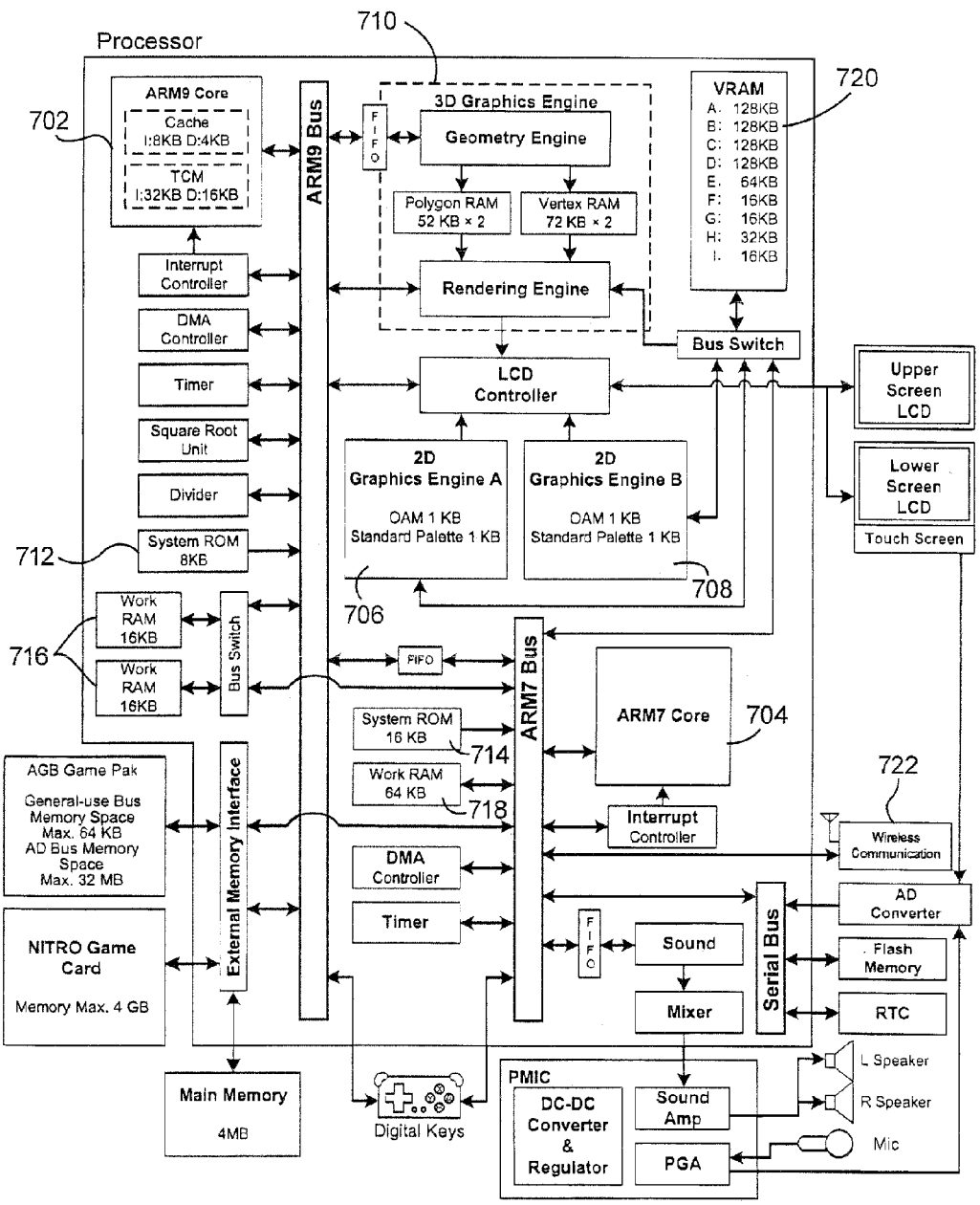
FIG. 7 is a more detailed overall system block diagram of the example portable display device.

FIG. 7 is a more detailed overall system block diagram of the example portable game machine. As shown in this diagram, the processor is a combined chip that consolidates ARM9 and ARM7 CPU cores 702, 704 (e.g., ARM946E-S at 67.028 MHz and ARM7TDMI at 33.514 MHz) with portable game system features and memory for the 2D and 3D graphics engines. The 2D graphics engines A and B (706, 708) operate at 33.514 MHz. The 3D graphics engine 710 includes a geometry engine and a rendering engine.

An example geometry engine has the following features:
operates at 33.514 MHz
maximum 4 million vertices/second
6-plane clipping
Lighting (4 parallel light sources)
matrix stack
texture coordinate conversion
box culling test
An example rendering engine has the following features:
operates at 33.514 MHz
maximum 120 thousand polygons/second
maximum 30 million pixels/second
triangular and quadrilateral rendering
texture format:
4-, 16-, and 256-color palette formats
bitmap format
4×4 texel compression format
translucent (A3I5, A5I3) format
texture size: 8×8 to 1024×1024
alpha blending
alpha test
fog
toon shading
edge marking
anti-aliasing The example portable game machine includes various memories. System ROM 712 for the ARM9 core is 8 KB (2K×32 bit) and system ROM 704 for the ARM7 core is 16 KB (4K×32 bit). Internal work RAM 716 shared by the ARM9 and the ARM7 is 32 KB (8K×32 bit) and ARM7 dedicated work RAM 718 is 64 KB (16K×32 bit). There is a total of 656 KB of VRAM 720, i.e., VRAM A to VRAM I (128 KB+128 KB+128 KB+128 KB+64 KB+16 KB+16 KB+32 KB+16 KB).

The on-board wireless communication circuit 722 is capable of using, for example, the 2.4 GHz bandwidth. The following modes are available:

Internet that allows connections to wireless LAN access points

Multi-Card play that enables communication with up to 16 other game devices

Single-Card play that downloads games from a parent game device to child game devices that are not equipped with game cards Additional details of the operation of the game device 10 may be found in application Ser. No. 11/127,297, the contents of which are incorporated herein.

Figure 8:
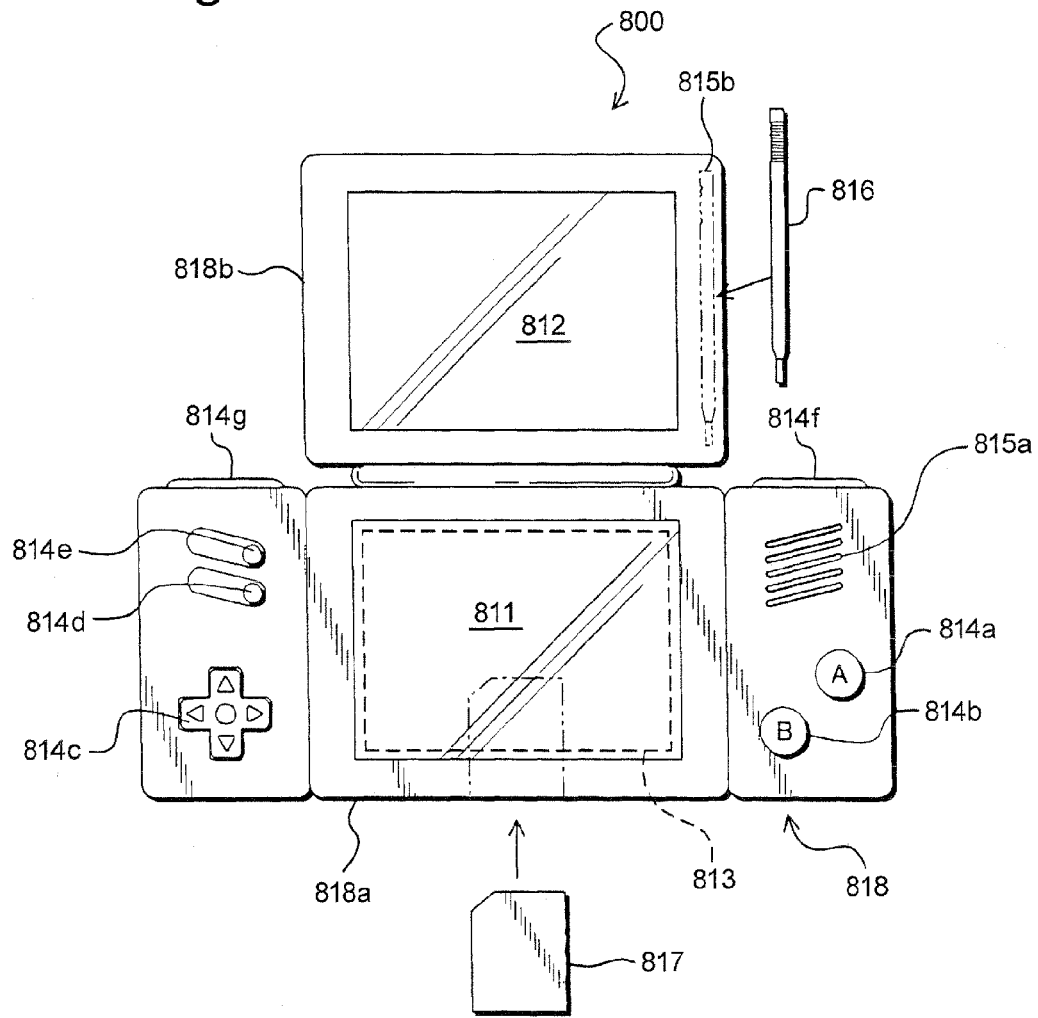
FIG. 8 is an external view of another example portable display device on which the browser described herein may be used.

FIG. 8 is an external view of a portable display device (in this case, another game device) in accordance with another example embodiment on which applications such as the web browser described in detail below may be executed. In FIG. 8, a game device 800 includes two liquid crystal displays (LCDs) 811 and 812 which are accommodated in a housing 818 so as to establish a predetermined positional relationship therebetween. Specifically, in order to accommodate the first and second LCDs 811 and 812 in a vertical direction, the housing 818 includes a lower housing 818a and an upper housing 818b. The upper housing 818b is supported on a portion of an upper side surface of the lower housing 818a so as to be freely flipped about that portion of the upper side surface of the lower housing 818a. The upper housing 818b has a planar shape slightly larger than the second LCD 812, and a top surface of the upper housing 818b has an opening to expose a display screen of the second LCD 812. The lower housing 818a has a planar shape wider than the upper housing 818b, and a top surface of the lower housing 818a has an opening substantially formed in its center so as to expose a display screen of the first LCD 811. The lower housing 818a has sound holes 815a for a loudspeaker 915 (see FIG. 9) provided on one of two sides opposed to each other with respect to the first LCD 811, and also have elements of an operating switch section 814 provided on either one of the two sides.

Specifically, the operating switch section 814 includes operating switches 814a and 814b, a cross direction keypad 814c, a start switch 814d, and a select switch 814e. The operating switches 814a and 814b are provided on the top surface of the lower housing 818a so as to be located to the right of the first LCD 811. The cross direction key pad 814c, the start switch 814d, and the select switch 814e are provided on the top surface of the lower housing 818a so as to be located to the left of the first LCD 811. The operating switches 814a and 814b are used for inputting instructions to jump, punch, operate a weapon, and so on in an action game, or inputting instructions to obtain an item, select and determine a weapon or a command, and so on in a role playing game (RPG) such as a simulation RPG. The cross direction keypad 814c is used for indicating a moving direction on a game screen, e.g., a direction to move a player object (or a player character) which can be operated by the player, or a direction to move a cursor. If necessary, additional operating switches may be provided, or side switches 814f and 814g may be provided respectively on right and left sides of the upper side surface of the lower housing 818a as shown in FIG. 8.

Further, a touch panel 813 is provided on the first LCD 811 (as indicated by broken lines in FIG. 8). For example, the touch panel 813 may be of a resistive film type, an optical type (an infrared type), or a capacitive coupling type. When a stylus 816 (or a finger) presses, strokes, or moves on the touch panel 813, the touch panel 813 detects a coordinate position of the stylus 816 and outputs coordinate data.

The upper housing 818b has a storage hole 815b (indicated by two-dot dashed lines in FIG. 8) formed in the vicinity of a side surface thereof in order to store the stylus 816 for operating the touch panel 813 as necessary. The lower housing 818a has a cartridge insertion portion (indicated by one-dot dashed lines in FIG. 8) in a side surface thereof in order to freely load/unload a game cartridge 817. The cartridge 817 includes an information storage medium, e.g., a nonvolatile semiconductor memory such as a ROM or a flash memory, and has a program such as a game program recorded in the information storage medium. The cartridge insertion portion includes a connector (see FIG. 9) for electrically connecting the cartridge 817 to the game device 800. The lower housing 818a (or the upper housing 818b) accommodates an electronic circuit board having mounted thereon various electronics including a CPU. Note that the information storage medium having a game program stored therein is not limited to a nonvolatile semiconductor memory, and may be an optical disk such as a CD-ROM or a DVD.

Figure 9:
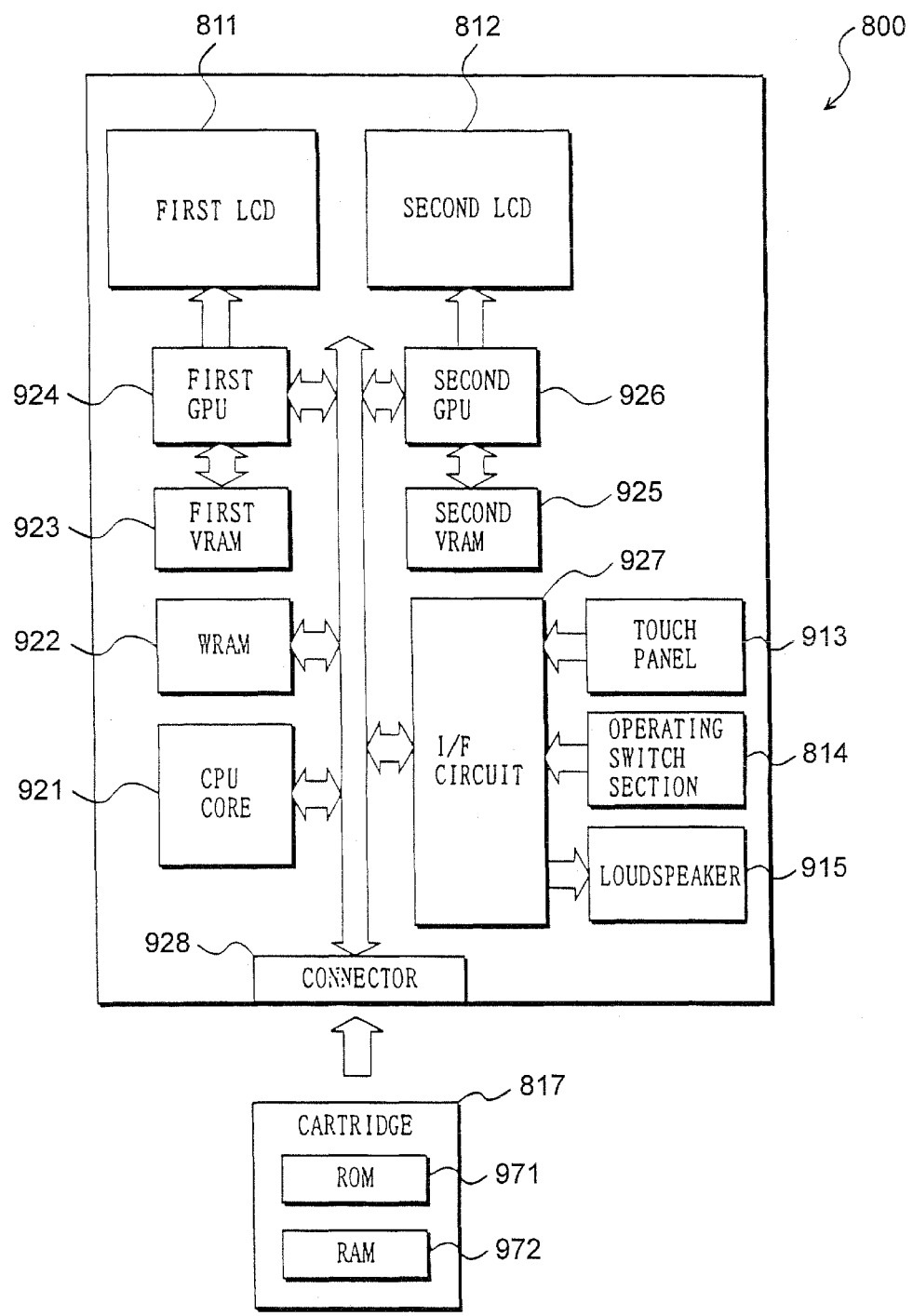
FIG. 9 is a block diagram showing the internal structure of the example portable display device of FIG. 8.

An internal structure of the game device 800 is described now with reference to FIG. 9.

In FIG. 9, the electronic circuit board accommodated, for example, in the housing 818a has a CPU core 921 mounted thereon. The CPU core 921 is connected through a predetermined path to a connector 928 for connection to the cartridge 817, and also connected to an input and output interface (I/F) circuit 927, a first graphics processing unit (GPU) 924, a second GPU 926, and a working RAM (WRAM) 922.

The cartridge 817 is detachably connected to the connector 928. As described above, the cartridge 817 is a storage medium having a program stored therein, and specifically includes a ROM 971 in which the program is stored and a RAM 972 for storing backup data in a rewritable manner. The program stored in the ROM 971 of the cartridge 817 is loaded to the WRAM 922, and then implemented by the CPU core 921. The WRAM 922 stores temporary data obtained by the CPU core 921 implementing the program or data for generating images.

The I/F circuit 927 is connected to the touch panel 813, the operating switch section 914, and the loudspeaker 915. The loudspeaker 915 is located behind a portion of the lower housing 818a where the sound holes 815b are formed. A wireless communication circuit (not shown) may also be provided.

The first GPU 924 is connected to a first video RAM (VRAM) 923, and the second GPU 926 is connected to a second VRAM 925. The first GPU 924, responsive to an instruction from the CPU core 921, generates a first image (such as a game image or web page image) based on data for generating an image stored in the WRAM 922, and renders the generated image on the first VRAM 923. The second GPU 926, responsive to an instruction from the CPU core 921, generates a second image (such as a game image or web page image) based on data for generating an image stored in the WRAM 922, and renders the generated image on the second VRAM 925.

The first VRAM 923 is connected to the first LCD 811, and the second VRAM 925 is connected to the second LCD 812. The first GPU 924 outputs the first image rendered on the first VRAM 923 to the first LCD 811. The first LCD 811 displays the first image outputted from the first GPU 924. The second GPU 926 outputs the second image rendered on the second VRAM 925 to the second LCD 812. The second LCD 812 displays the second image outputted from the second GPU 926.

Additional details regarding the above-described game apparatuses may be found in U.S. Publication Nos. 2005-0227761; 2005-0164794; and 2005-0159223 and application Ser. Nos. 10/921,921 and 11/127,297, the contents of each of which are incorporated herein in their entirety.

As noted above, the example portable display devices include wireless communication circuitry that enables wireless communication with, among other things, wireless LAN access point(s). These wireless access points can provide, among other things, a connection to the Internet. The access points may be provided in public areas (e.g., stores, libraries, sports arenas, stadiums, public transportation vehicles such as buses and trains, airplanes, etc.) or in offices or homes. For example, in a home environment, the access point may be embodied as a computer that is connected to the Internet via, for example, a dial-up connection or a cable modem. In alternative implementations, wireless or wired communication circuitry may be connected to the portable display device via one of cartridge slots (e.g., slot 58 or slot 64). For example, the communication circuitry may be embodied in a cartridge adapted to fit in one of these slots. This communication circuitry may, for example, connect by wired link to the public switched telephone network or to a local area network to thereby provide Internet access. In other implementations, the communication circuitry may wirelessly connect to a base station of a mobile telephone network through which a connection to the Internet may be established.

Various applications may utilize the gesture inputs described in detail below. The example application described herein is a web browser program that is executed by the processing circuitry of the portable display device and may be permanently stored in on-board memory of the portable display device. In this case, the web browser program may be identified on a menu or by an icon when the portable display device is turned on. The browser may be executed by selecting it from the menu or by selecting the icon. Alternatively, the browser program may stored in a memory device on a cartridge connected to the portable display device via one of the slots 58 and 64.

Generally speaking, the example web browser program accesses web servers on the Internet using the hypertext transport protocol (HTTP), obtains data from the servers, processes the data in accordance with its type (e.g., text, images, etc.), and displays, if necessary, after laying the data out to fit the screen(s). The web browser program may use the two LCD screens 32 and 88 (or 811 and 812) described above, thus achieving a multi-window display.

The web browser program described herein (as well as other applications) may be implemented in software executable by a processing circuitry of the portable display device, e.g., as a set of instructions (program code) in a code module resident in a random access memory accessible to the processing circuitry. Until required by the processing circuitry, the set of instructions may be stored in another memory (e.g., in a memory card removably connectable to the portable display device) or may be downloaded via the Internet or other computer network.

The web browser program allows quick and easy navigation via gestures made with a stylus on touch panel 32 (or 813). These gestures include a "slide up" gesture in which the stylus (or other pointing device such as a user's finger) is brought into contact with the touch panel 32 and then moved or dragged (slid) in an upward direction. Similarly, a "slide down" gesture may be performed by bringing the stylus into contact with the touch panel 32 and then moving the stylus in a downward direction. "Slide right" and "slide left" gestures may be performed by bringing the stylus into contact with the touch panel 32 and then moving the stylus in a rightward or leftward direction, respectively. Other gestures may be developed which are combinations of the aforementioned gestures. For example, one gesture may be comprised of the "slide up" gesture followed by the "slide down" gesture and another gesture may be comprised of the "slide down" gesture followed by the "slide up" gesture. Similarly, one gesture may be comprised of the "slide right" gesture followed by the "slide left" gesture and another gesture may be comprised of the "slide left" gesture followed by the "slide right" gesture.

Of course, the above-described gestures are provided by way of example only and it will be appreciated that other gestures may be developed and utilized based on the description herein.

The input gestures may be recognized in accordance with a routine provided as part of the web browser program. Alternatively, a separate gesture recognition routine or application may be provided for recognizing the gesture based on the path of the stylus (or finger) on the touch panel 32 and providing data indicative of the recognized gesture to the web browser program. Generally speaking, the recognition may be performed based on comparisons between input gestures and a gesture recognition database stored in memory accessible to the processing circuitry of the portable display device.

The following sections explain the operations a user can perform with the touch panel 32 of portable display device 10. Clearly similar operations may be performed with the other example portable display devices.

1.1 Touch Panel Area

In an example implementation of the web browser program, the touch panel 32 is divided into the following areas. The program performs its processes in response to the area that the user touches.

| Class, by how area changes | Name of Area | Description |
| --- | --- | --- |
| Fixed area | Menu Icon | Button that pops up a menu icon |
| Areas that change by user operation | Scroll Bar Handle | The handle part of a scroll bar |
| | Scroll Bar Bar | The bar part of a scroll bar |
| | Tab | Tab for operating the upper screen |
| | Menu Item | An item when a menu pops up |
| Areas that change by HTML drawing | With Text Link | |
| | No Text Link | |
| | With Image Link | |
| | No Image Link | |
| | Background | Area with no functions |

1.2 Touch Screen Input Mode

The user can switch the input mode of the touch screen 32 by, for example, selecting an input mode from the menu. In other instances, the input mode may be switched automatically as needed by the program. In some example implementations, the cursor characteristics (shape, color, size, etc.) may vary depending on the input mode.

| Input Mode | Function |
| --- | --- |
| Select Mode | Follows a hyperlink and selects an image, text string or input slot |
| Zoom Mode | Zooms in or out on an image |
| Scroll Mode | Scrolls the screen |
| Menu Mode | Menu icon pops up and executes the process associated with an icon that is touched |
| Input Disable Mode | Disables input; used when input is temporarily not desired |

1.3 Actions

When the user operates touch screen 32, the example web browser program processes the input first of all according to the area where it is touched, and by the input mode of the touch screen and according to the gestures as described below.

1.3.1 Select Mode

When the stylus input mode is in the select mode, the web browser program operates as follows. When the web browser program starts and nothing has been input, the program will be in this mode.

After an area is touched and the example web browser program starts executing the corresponding operation, even if another area is entered, for example, during sliding, the operation does not change.

| Area | Action | Process |
| --- | --- | --- |
| Menu Icon | Touch | Pops up/down the main menu |
| Scroll Bar Handle | Touch | Does nothing |
|  | Slide | Scrolls the HTML screen, moves the handle |
| Scroll Bar Bar | Touch | Scrolls the HTML screen, moves the handle |
|  | Slide | Does nothing |
| Tab | Touch | Displays on the upper screen the captured screen corresponding to the tab touched |
|  | Slide down | Displays the URL screen corresponding to the slid tab on the lower screen |
|  | Slide Up after Slide Down | Displays the page corresponding to the tab on the lower screen and displays the page currently on the lower screen on the upper screen |
| Menu item | Touch | Executes the selected process (refer to Menu Item) |
| Text link, Image link | Touch | Displays the web page for the link address in the lower screen; no change in the upper screen |
|  | Slide up | Creates an image of the web page for the link address in the main memory; captures it and displays it on the upper screen |
|  | Slide down | Captures the current lower screen and displays it on the upper screen; displays the web page for the link address on the lower screen |
| Background | Slide Left | Returns to previous page (does nothing if it is the first page) |
|  | Slide Right | Advances to next page (does nothing if it is the last page) |
|  | Slide Down | Copies the upper screen to the lower screen |
|  | Slide Up | Copies the lower screen to the upper screen |
|  | Slide Down after Slide Up | Switches the upper and lower screens |
|  | Slide Right after Slide Left | Cancels operation |
|  | Slide Left after Slide Right | Cancels operation |

1.3.2 Zoom Mode

When the stylus input mode is in the zoom mode, the example web browser program processes inputs as follows:

| Area Name | Action | Process |
| --- | --- | --- |
| Menu Icon | Touch | Menu pops up/down |
| Any other area | Touch | Does nothing |
|  | Slide Up | Zooms in on the HTML image on the lower screen |
|  | Slide Down | Zooms out on the HTML image on the lower screen |

1.3.3 Scroll Mode

When the stylus input mode is in the scroll mode, the example web browser program processes as follows.

| Area Name | Action | Process |
| --- | --- | --- |
| Menu Icon | Touch | Menu pops up |
| Any Other Area | Touch | Does nothing |
|  | Slide | Moves the lower screen HTML image in accordance with the sliding |

1.3.4 If a Menu Icon has been Touched (Same in All Modes)

When a menu icon is touched, the example web browser program acts the same in all modes. Until a pop-menu displayed is closed, touching a menu icon area will not cause anything to happen.

| Area Name | Action | Process |
| --- | --- | --- |
| Menu Item | Touch | Executes the process allocated to the item |
| Any Other Area | Touch | Closes the menu |
|  | Slide | Does nothing |

1.4 Menu

An example menu may have the following items, touching each of which causes the process allocated to it to be executed.

| Item | Action |
| --- | --- |
| Stop | Cancels the download of an HTML |
| Previous page | Moves to the previous page |
| Next page | Moves to the next page |
| Default page | Moves to the default page |
| Reload | Reloads the current page |
| URL input | URL input via the onscreen keyboard |

| Item | Action |
| --- | --- |
| Register bookmark | Registers the current page in a bookmark list |
| Refer to bookmarks | Bookmark list pops up |
| Stylus select mode | Puts the stylus in the select mode |
| Stylus zoom mode | Puts the stylus in the zoom mode |
| Stylus scroll mode | Puts the stylus in the scroll mode |
| Properties | Moves to the properties setting screen |
| Menu push down | Closes the menu |

1.4.1 Navigation

When Stop, Previous Page, Next Page, Default Page, Reload or Input URL is selected, the corresponding URL is displayed.

1.4.2 Bookmarks

When Register Bookmark is selected, a dialog box comes up prompting the user to register a bookmark. If OK is selected, the current URL is registered and saved in the bookmarks section. If Cancel is selected, the Register Bookmark dialog box closes. If Refer to Bookmarks is selected, the Bookmark Menu is displayed. The Bookmark Menu is displayed in a window with a scroll bar. If a bookmark is touched, the web browser program obtain the web page corresponding to that URL.

If there are so many menu items they cannot be displayed in a window, the scroll bar can be used to change what is being displayed.

1.4.3 Changing the Touch Screen Input Mode

When the Switch Touch Screen Mode icon is touched, a sub-menu pops up and the user can select from among the Select Mode, Scroll Mode and Zoom Modes.

1.4.4 Properties Page

The Properties Page displays a dialog box which can be used to make settings such as user information, internet provider, etc.

1.4.5 Close Menu

The menu closes if the menu popup/down icon is touched. The following functions may also be provided.

Character String Input

An input function can use the touch screen so that input can be made via handwriting or with an on-screen keyboard.

Image Input

Symbol data (vector, raster) can be input.

Multi-Boot

Using a multi-boot function, a service can be provide in which a user can simultaneously download the browser software and the desired home page.

Extended Function

Will permit websites compatible with the browser to realize functions that cannot be achieved by other browsers by executing original scripts written for the portable device 10.

MIME Type

Browser unique applications

XHTML Extended Tags

Extends tags using XHTML, achieving operations unique to portable device 10.

Upper Screen Copy Anchor Tags

When links that are defined with these tags are touched, they are displayed in the upper screen. This would make it possible, for example, if the content were a picture book and if a link were attached to a picture corresponding to some text, when the text was touched, the picture would be displayed in the upper screen.

Dictionary Search Anchor Tag

Using this tag, highlighted text would be looked up from a preset dictionary site and the results would be displayed in the upper screen.

Text Search Mode

A special mode for searching and perusing text. In this mode, when a character string is selected with the stylus, if it is slid up (i.e., a "slide up" gesture in which the stylus (or other pointing device) is brought into contact with the character string and the stylus is then moved upward on the screen), a search request is sent out for that word to the preset search or dictionary site and the results are displayed on the upper screen. If it is slid down (i.e., a "slide down" gesture in which the stylus (or other pointing device) is brought into contact with the character string and the stylus is then moved downward on the screen), the search results are displayed in the lower screen while the currently displayed page is displayed in the upper screen.

Game Download Function

Games can be downloaded and played.

Agent Function

Various agents can be downloaded and used.

Other Example Functions and Operations

The following additional example functions and operations may be utilized in a web browser program.

1) If a user touches a link displayed on the lower screen and slides it upward, the web page for the linked URL will be displayed on the upper screen.

2) If a user touches a link displayed on the lower screen, slides it upward and then downward, the web page for the linked URL will be displayed on the lower screen and the screen previously displayed on the lower screen will be displayed on the upper screen.

3) If a user touches a position other than a link on the lower screen and slides it upward, the screen displayed on the lower screen will be copied and displayed on the upper screen.

4) If a user touches a position other than a link on the lower screen, slides it upward and then downward, a screen displayed on the lower screen will be switched with the one displayed on the upper screen.

5) If a user touches a position other than a link on the lower screen and slides it downward, a screen displayed on the upper screen will be copied and displayed on the lower screen.

6) If a user touches a position other than a link on the lower screen and slides it to the left, the user will be able to go back to the last page.

7) If a user touches a position other than a link on the lower screen and slides it to the right, the user will be able to go to the next page.

8) If a user touches an image and slides it upward, a magnified image will be displayed on the upper screen.

9) If a user slides a tab downward, a corresponding screen will be displayed on the lower screen.

10) If a user slides a tab downward and then upward, a screen displayed on the upper screen will be switched with the one on the lower screen, which respectively correspond to the tab.

11) If a user circles a field by using a stylus on the lower screen and slide it upward, the field will be magnified and displayed on the upper screen.

12) Setting up a tab that will be displayed on the upper screen when touched.

Some of the above-described functions and operations are discussed below with reference to FIGS. 10-13.

Figure 10:
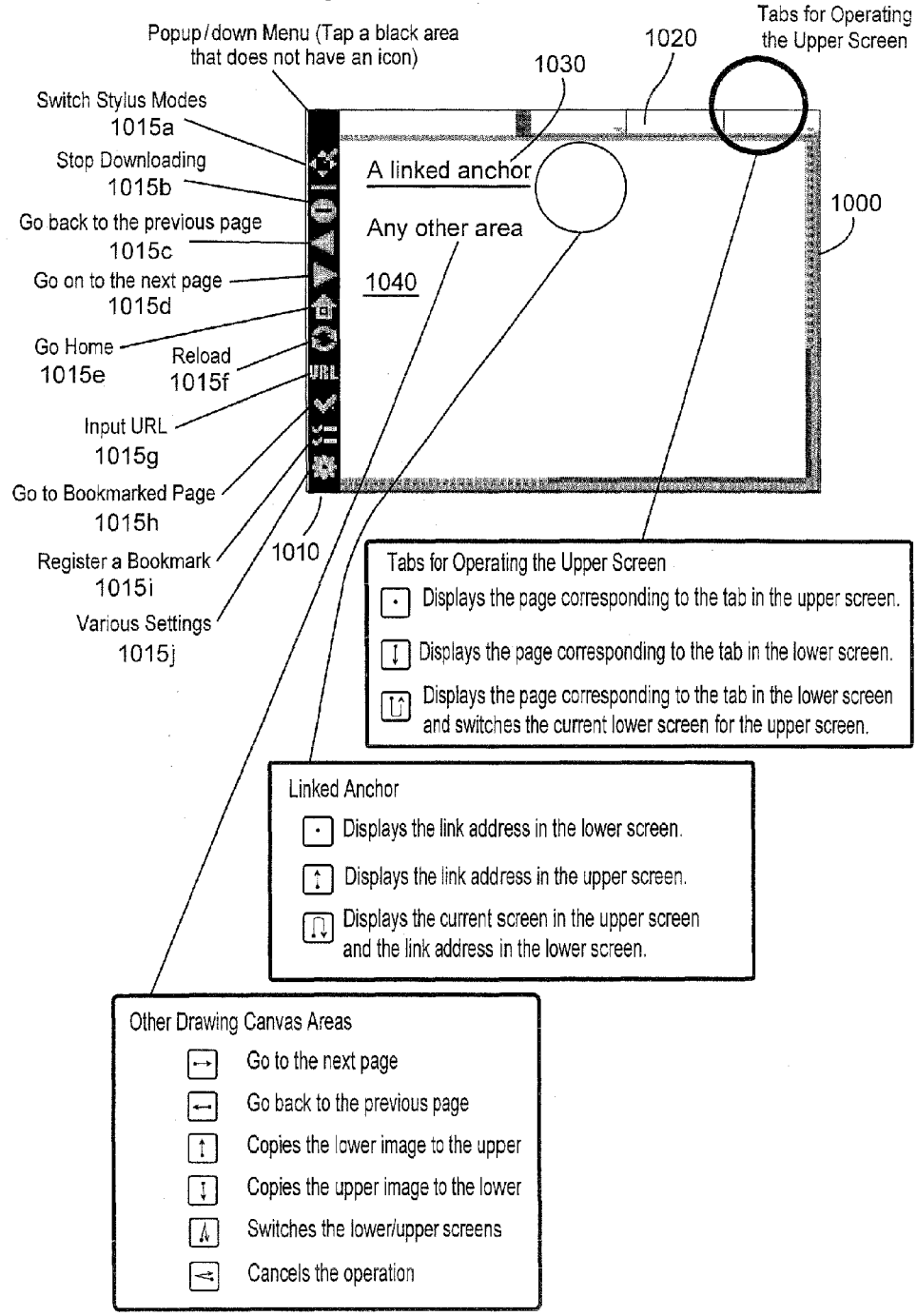
FIGS. 10-13 illustrate various features of the browser described herein.

FIG. 10 shows a browser screen 1000 in accordance with one example implementation. The screen includes a menu section 1010, a tab area 1020, a link area 1030 and an "other" area 1040.

The menu section 1010 include various icons 1015a-1015j. The functions/processes associated with these icons may be invoked by touching the icons with the stylus.

Icon 1015a is a "switch stylus modes" icon that, when touched, causes a sub-menu to pop up from which the user can select from among the Select, Scroll and Zoom modes. In an alternative implementation, touching the icon 1015a a first time sets the Select mode, touching a second time sets the Scroll mode, touching a third time sets the Zoom mode, touching a fourth time sets the Select mode, etc.

Icon 1015b is a "stop downloading" icon that, when touched, stops any current downloading of a web page.

Icon 1015c is a "previous page" icon that, when touched, causes display of a previous web page. If the user is at the first page, touching icon 1015c has no effect.

Icon 1015d is a "next page" icon that, when touched, causes display of a next web page. If the user is at the last page, touching icon 1015d has not effect.

Icon 1015e is "home page" icon that, when touched, causes a home (default) page to be downloaded. An initial home page setting may be made at the time of installing the web browser program, and the user may modify this setting using, for example, a "settings" function.

Icon 1015f is a "reload" icon that, when touched, causes the current web page to be reloaded.

Icon 1015g is an "input URL" icon that, when touched, causes a screen (or screens) to be displayed to permit a user to input an URL either using an on-screen keyboard or by handwriting.

Icon 1015h is a "Go to Bookmarked Page" icon that, when touched, causes a list of bookmarked web pages to displayed from which the user can select.

Icon 1015i is a "Register Bookmark" icon that, when touched, causes the current web page to be added to the list of bookmarked pages.

Icon 1015j is a "Settings" icon that, when touched, causes display of a screen (or screens) that a user can use to set various browser properties (e.g., home page, security settings, and the like).

Of course, other implementations that include different icons may be used. In one implementation, the user can use the "Settings" function to determine the order and presence/absence of various icons on the menu display.

Tab area 1020 includes a plurality of tabs each associated with one of one or more screens for display on the upper screen. When one of the tabs is touched, the web page associated with that tab is displayed on the upper screen. When one of the tabs is slid down, the web page associated with that tab is displayed on the lower screen. When one of the tabs is slid down and then up, the web page corresponding to that tab is displayed on the lower screen and the web page currently displayed on the lower screen is displayed on the upper screen.

Link area 1030 contains for example a link to a web page. When the link is touched, the web page associated with the link is displayed on the lower screen. When the link is slid upward, the web page associated with the link is displayed on the upper screen. When the link is slid upward and then downward, the web page associated with the link is displayed on the lower screen and the web page currently displayed on the lower screen is moved to the upper screen.

"Other" area 1040 may also be used to perform operations using drawn gestures. For example, sliding right on the other area 1040 causes a "next" web page to be displayed. Sliding left on the other area 1040 causes a "previous" web page to be displayed. Sliding up on the other area 1040 copies the web page currently displayed on the lower screen to the upper screen. Sliding down on the other area 1040 copies the web page currently displayed on the upper screen to the lower screen. Sliding up and then down on the other area 1040 switches the displays on the upper and lower screens. Sliding left and then right cancels an operation.

Figure 11:
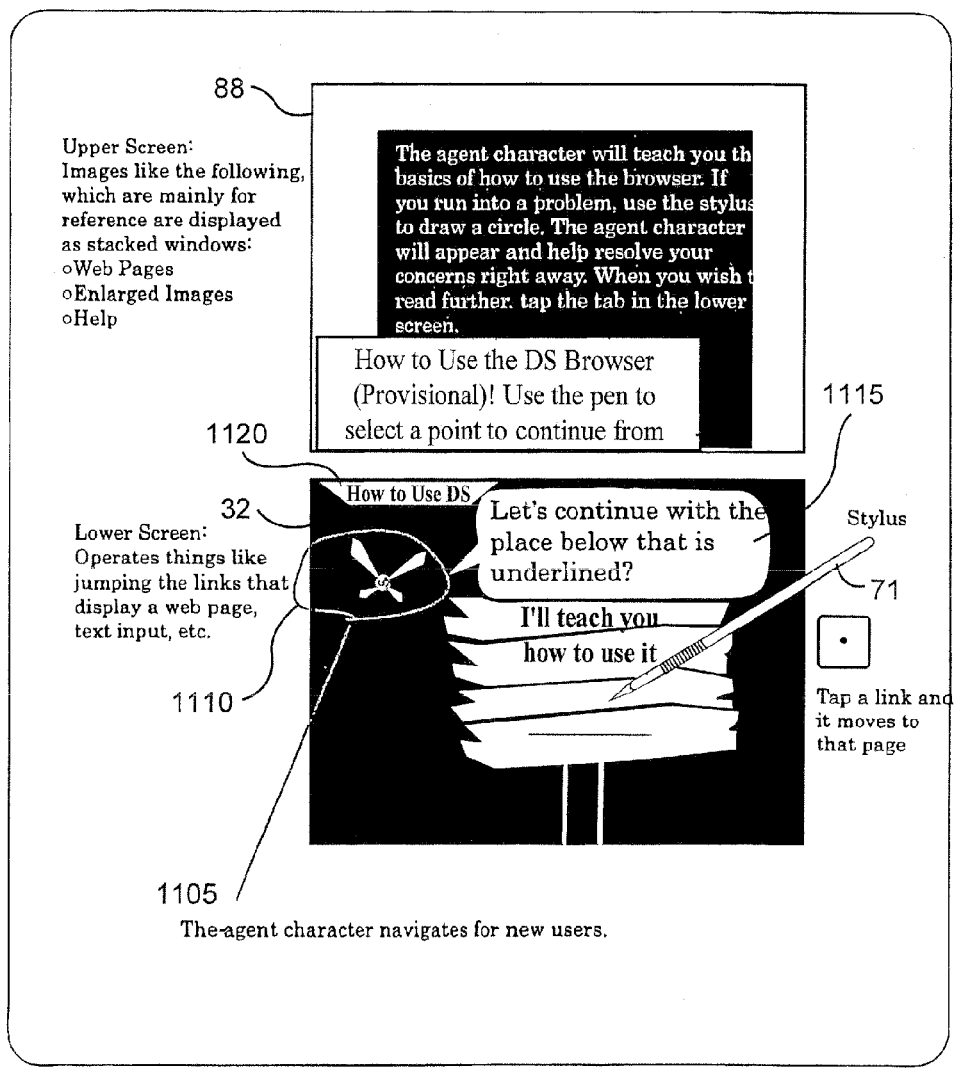

FIG. 11 shows an example of a tutorial for new users of the browser described herein. In this example, the browser is provided with an associated agent character 1105 that provides assistance or help in using the browser. As shown in FIG. 11, the agent character is invoked by drawing a circle 1110 using the stylus. The agent character appears 1105 in the circle 1110 and provides assistance to the user. In the implementation of FIG. 11, the assistance is in the form of text 1115, but aural or graphical assistance may be provided alternatively or additionally. Assistance may also be provided via tabs such as the "How to Use DS" tab 1120 shown in the lower screen. The lower screen may be used, for example, to touch links to web pages, provide textual input (e.g, an URL) and the like.

As noted in FIG. 11, pages such as the depicted help page or web pages may be stacked on the upper screen. These stacked pages are stored in memory and newly pages for the upper screen (sent, for example, using gestures as described above) are added to the top of the stack. In the example web browser program, these stacked pages are respectively associated with tabs and the pages may be accessed and manipulated using, for example, the tab commands described above. In one implementation, a "clear" stack command may be provided to clear the stack of pages associated with the upper screen. In another implementation, a "save" stack command may be provided to save the stack of pages associated with the upper screen. This save command is useful, for example, to save a stack of screens associated with a particular topic of interest.

Figure 12:
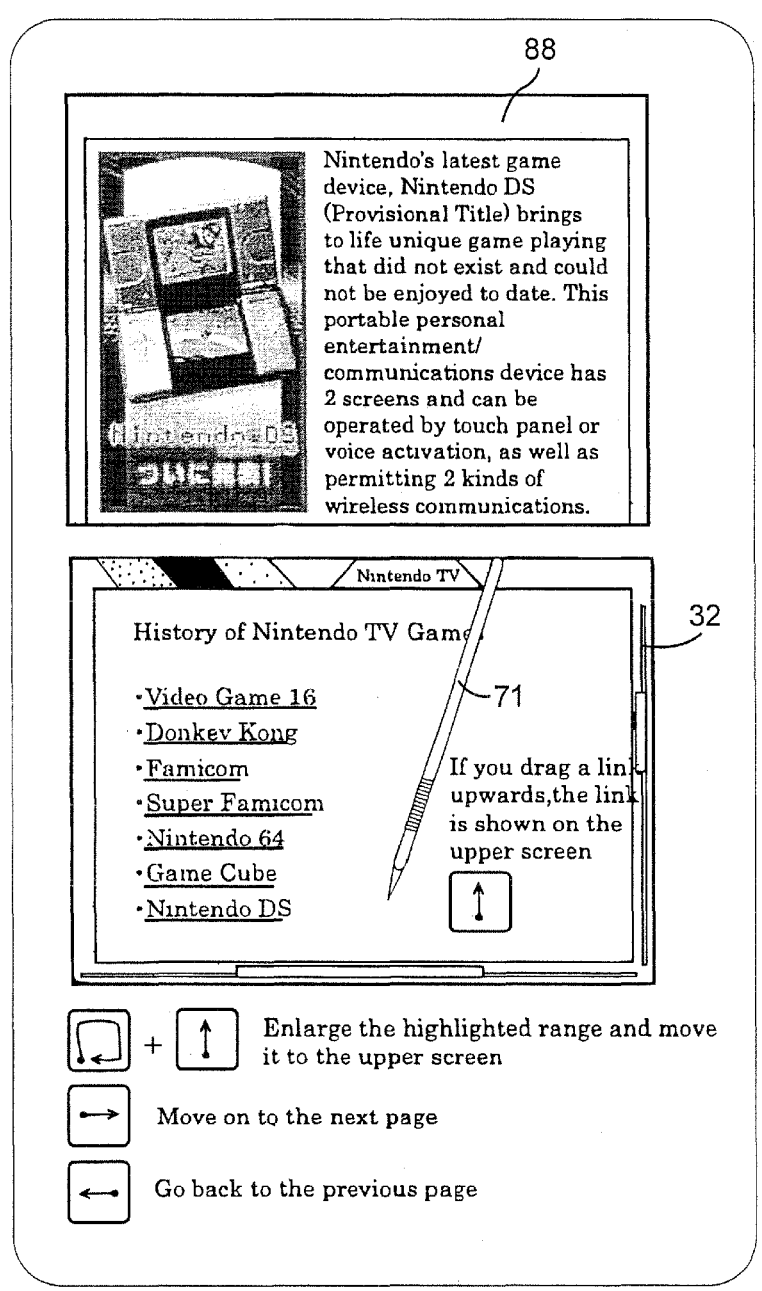

FIG. 12 shows example upper and lower screens in normal usage. The lower screen includes various links to web pages for the History of Nintendo games (i.e., Video Game 16, Donkey Kong, Famicom, Super Famicom, Nintendo 64, Game Cube and Nintendo DS). If, for example, the Nintendo DS link, is slid upwards, the web page associated with that link is shown on the upper screen. As shown in the text accompanying FIG. 12, drawing a box around a portion of the web page displayed on the lower screen and then sliding up enlarges the surrounded portion and displays it on the upper screen. As further noted, sliding right moves to a next page and sliding left moves a previous page.

Figure 13:
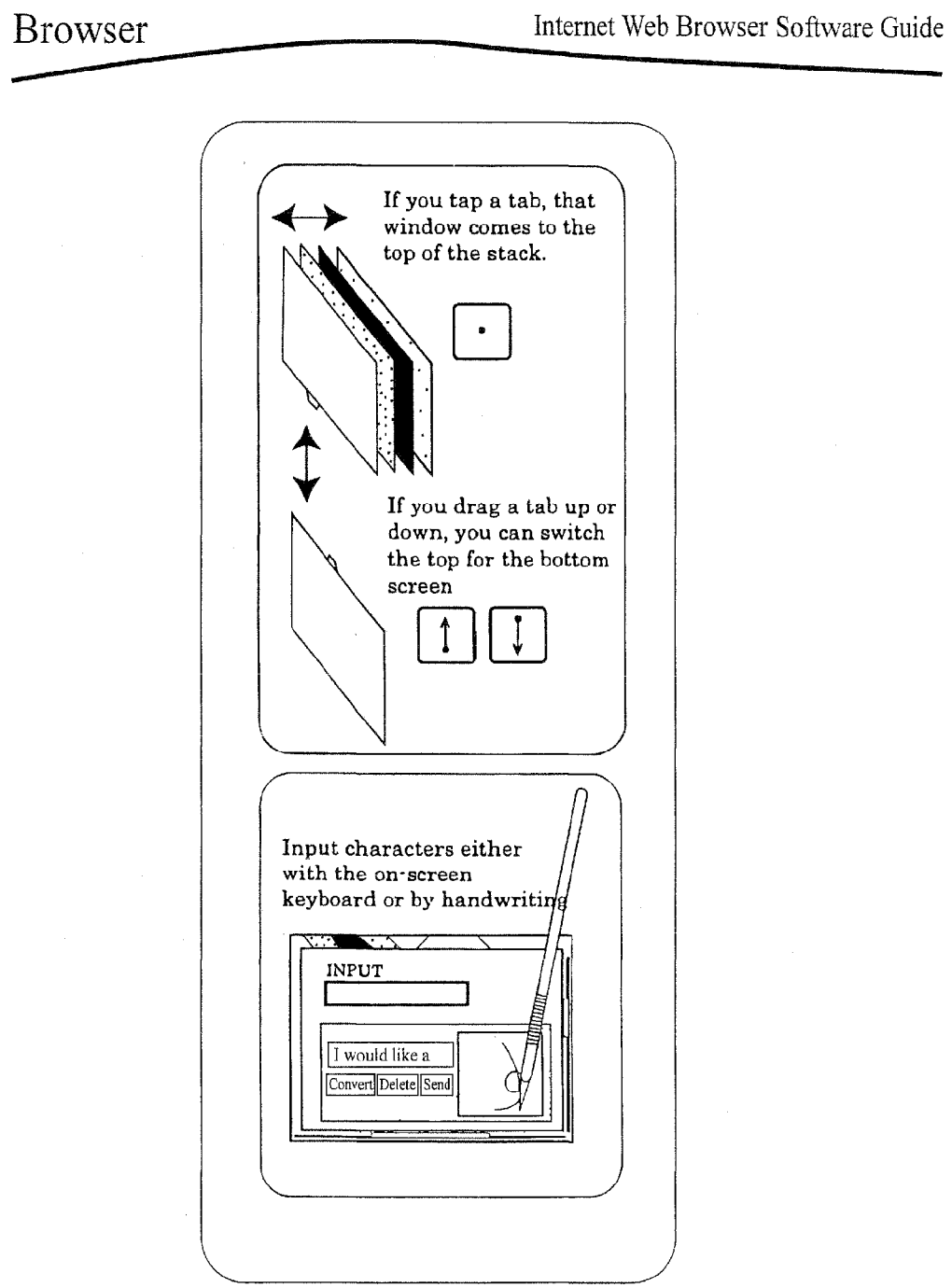

As shown in FIG. 13 and noted above, the memory of the portable device may store a stack of web pages for display on the upper screen. By touching a tab on the lower screen associated with one of the web pages in the stack, that web page may be displayed on the upper screen. By sliding down on a tab associated with a particular web page, that page can be displayed on the lower screen and the web page currently displayed on the lower screen can be moved to the top of the stack of web pages for the upper screen and displayed on the upper screen.

As further shown in FIG. 13, characters can be input using an on-screen keyboard (not shown) or a screen providing an area for inputting characters by handwriting.

While the gesture inputs have been described above in the context of a web browser, other implementations are possible. For example, text screens for providing help for applications running on the portable display system may include various pages with associated links and such text screens may also be manipulated using the gestures described above. In addition, the gestures described herein may be used for manipulating the displays on the upper and lower screens for other types of content. For example, a user watching a movie on the lower screen may slide up on the lower screen to cause the movie to be displayed on the upper screen. The movie may be returned to the lower screen by sliding up and then down.

Similarly, the game displays on the upper and lower screens may be controlled using gestures. For example, a game may provide different game scenes on the upper and lower screens. A player can, for example, provide touch-screen inputs to the scene on the lower screen and, upon the occurrence of a certain event in the game, use a gesture input to interchange the upper and lower screens, thereby enabling touch-screen inputs to be supplied to the scene that was originally on the upper screen.

Figure 14:
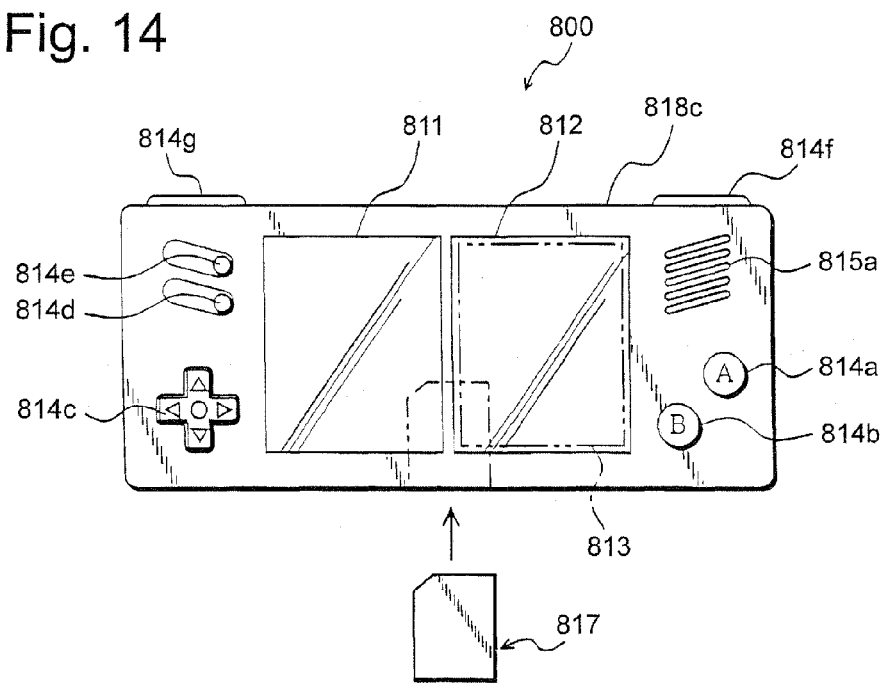
FIGS. 14-16 illustrate alternate example arrangements of a portable display device on which the browser described herein can be used.

Note that although an exemplary liquid crystal display section for simultaneously display two separate images has been described above with respect to a case where the two LCDs (e.g., 811 and 812) are arranged so as to be physically separated in a vertical direction, the LCDs 811 and 812 may be arranged side by side in a horizontal direction without using the upper housing. In order to arrange the LCDs side by side in a horizontal direction, as shown in FIG. 14, a housing 818c having a wide rectangular shape may be provided so as to accommodate the LCDs therein. In such a case, it is preferred that the LCD 812 having the touch panel 813 mounted thereon is located to the right of the LCD 811 in consideration that it is frequent for the users to be right-handed. However, the LCDs 811 and 812 may be arranged the other way around in a portable game apparatus for a left-handed user.

Figure 15:
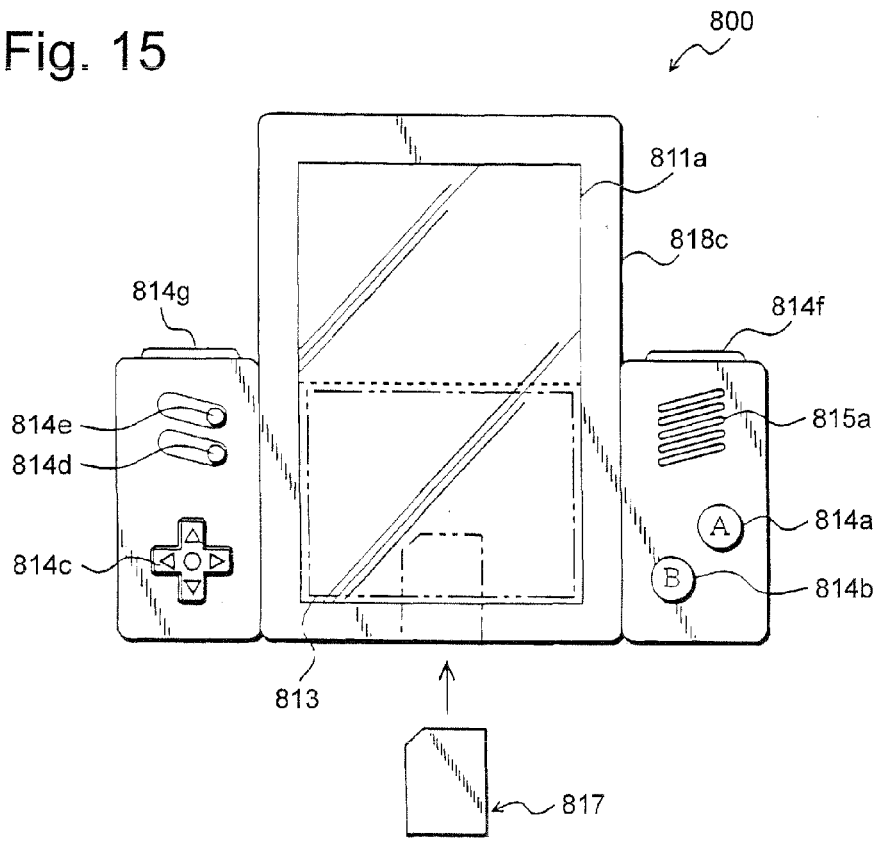
Figure 16:
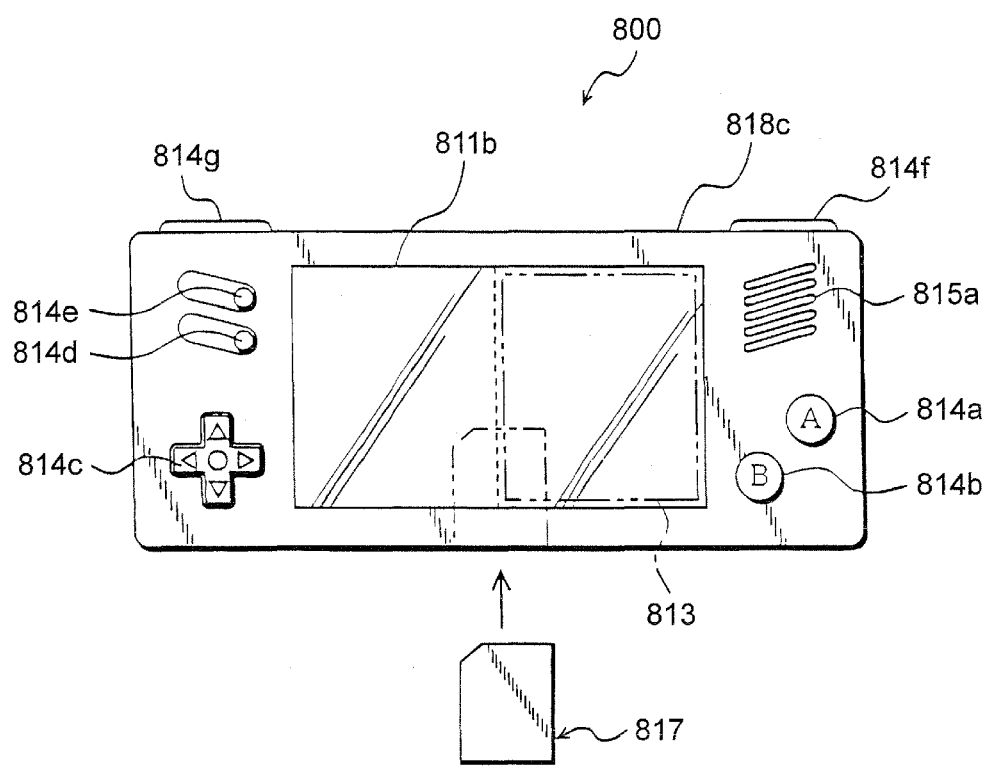

Further, instead of arranging the LCDs 811 and 812 so as to be physically separated in a vertical direction, an LCD 811a having a length twice the length of the LCD 811 and the same width as that of the LCD 811 as shown in FIG. 15 (i.e., the LCD 811a has physically one display screen having a size twice the size of the display screen of the LCD 811 in a vertical direction), may be provided so as to separately display two images on the display screen (such that the two images are adjacent to each other without a gap therebetween in a vertical direction). Alternatively, an LCD 811b having a width twice the width of the LCD 811 and the same length as that of the LCD 811 as shown in FIG. 16 (i.e., the LCD 811b has physically one display screen having a size twice the size of the display screen of the LCD 811 in a horizontal direction), may be provided so as to separately display two game images on the display screen (such that the two game images are adjacent to each other without a gap therebetween in a horizontal direction). In the examples of FIGS. 15 and 16, a plurality of images can be separately displayed on physically one display screen.

While the above examples have been described with reference to a portable display device with a touch-sensitive display screen, other implementations may use a touch pad separate from a display screen.

Figure 17:
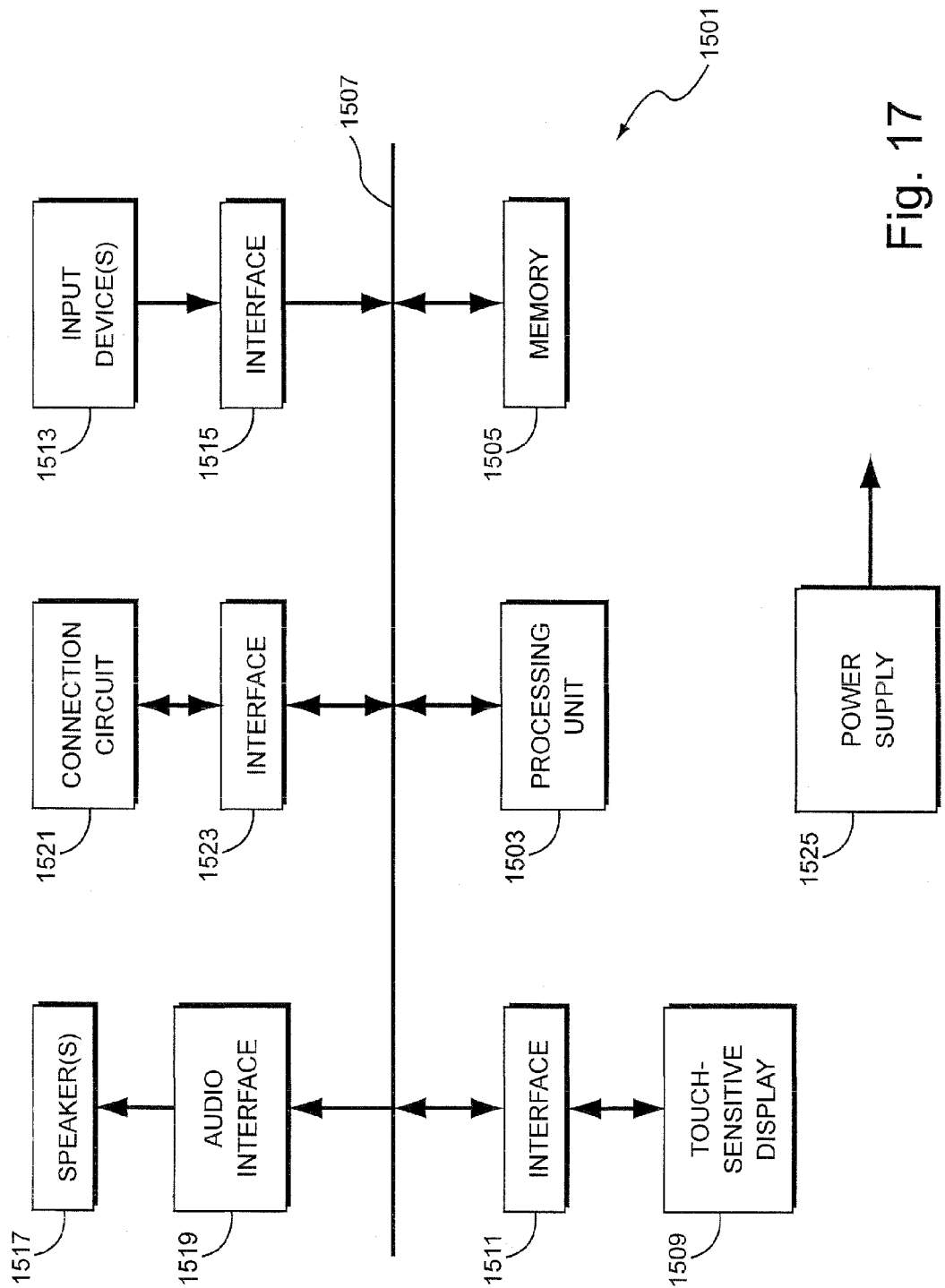
FIG. 17 is a block diagram showing another example portable display device on which the browser described herein can be used.

While the technology herein has been described in connection with exemplary illustrative non-limiting embodiments, the invention is not to be limited by the disclosure. For example, the browser may be executed on portable devices other than the portable device described above, including mobile telephones, personal digital assistants, hand-held game devices, personal computers, laptop computers, and the like. By way of example, FIG. 17 is a block diagram of another example portable device 1501 on which the browser described in detail above may be executed. This portable device is generally configured along the lines of a personal digital assistant (PDA) such as those available from Palm Inc., Handpsring, Inc., Sony and others, and which run an operating system such as Windows CE, EPOC, PalmOS and the like. System 1501 includes a processing unit 1503 and memory 1505. A system bus 1507 couples various system components including memory 1505 to processing unit 1503. Memory 1505 may include read only memory (ROM) and random access memory (RAM). Memory 1505 may also include external memory in the form of memory cards or memory sticks inserted into a suitable port provided in the housing for the components of system 1501. A touch-sensitive display screen (e.g., a touch-sensitive liquid crystal display screen) 1509 is also connected to system bus 1507 via an interface 1511. Inputs via touch-sensitive screen 1509 are typically made using a stylus or a user's finger. Other input devices 1513 such as pushbuttons, switches, pointing devices and the like are also connected to system bus 1507 via an interface 1515. The input devices may also include external keyboards or game control devices (e.g., joystick, game controller). Programs (such as the browser described herein) and other data may be written to memory 1505 using communication circuit 1521 which may take the form of a modem for downloading the game from the Internet, for example, or of a cradle (e.g., a USB cradle) for connecting system 1501 to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1501.

This application is intended cover all corresponding and equivalent arrangements whether or not specifically disclosed herein.

We claim:

1. A computer device comprising:
   a touch screen;
   wireless communication circuitry;
   one or more processors; and
   memory for storing a browser program for displaying web pages on the touch screen, wherein the one or more processors are configured to execute the browser program to control the computer device to at least:
      display, on the touch screen, a web page accessed via the wireless communication circuitry, the displayed web page including a link;
      based on receiving a first touch input on the touch screen for the link on the displayed web page, perform a first operation; and
      based on receiving a second touch input, different from the first touch input, on the touch screen for the link on the displayed web page, perform a second operation, different from the first operation,
      wherein the first and second operations are performed based on no received inputs other than the respective first and second touch inputs on the touch screen.

2. The computer device according to claim 1, wherein the first operation comprises displaying a web page corresponding to the link.

3. The computer device according to claim 1, wherein the one or more processors control the computer device to selectively display a graphical interface element concurrently with the displayed web page, the graphical interface element including at least a first touch image operable for displaying a previous web page, a second touch image operable for displaying a next web page, a third touch image operable for accessing a process to display a bookmarked web page and a fourth touch image operable for accessing a process to bookmark a web page.

4. The computer device according to claim 3, wherein the graphical interface element comprises a pop-up menu.

5. The computer device according to claim 3, wherein the first and second touch images comprise respective direction icons.

6. The computer device according to claim 3, wherein the third touch image is operable to cause display of a list of bookmarked web pages and the one or more processors are configured to control the computer device to access and display a bookmarked web page selected from the list in accordance with a selection input.

7. The computer device according to claim 1, wherein the one or more processors are configured to control the computer device to selectively display a graphical interface element concurrently with the displayed web page, the graphical interface element including a touch image operable for accessing a process to input a uniform resource locator (URL).

8. The computer device according to claim 7, wherein the one or more processors are configured to control the computer device to display a keyboard on the touch screen operable for inputting the URL.

9. The computer device according to claim 1, wherein the one or more processors are configured to control the computer device to selectively display a pop-up graphical interface element concurrently with the displayed web page, the pop-up graphical interface element including a touch image operable for reloading a current web page.

10. The computer device according to claim 1, wherein the one or more processors are configured to control the computer device to selectively display a pop-up graphical interface element concurrently with the displayed web page, the pop-up graphical interface element including a touch image operable for stopping downloading of a current web page.

11. The computer device according to claim 1, wherein the one or more processors are configured to control the computer device to zoom in/out on the displayed web page in response to respective zoom in/out gestures input to the touch screen.

12. The computer device according to claim 1, wherein the one or more processors are configured to control the computer device to scroll the displayed web page up/down in response to respective scroll up/down gestures input to the touch screen.

13. The computer device according to claim 1, wherein the one or more processors are configured to execute the browser in response to selection of a corresponding icon displayed on the touch screen.

14. The computer device according to claim 1, implemented as a mobile telephone.

15. A non-transitory computer-readable storage medium storing one or more programs which, when executed by processing circuitry of a computer device comprising a touch screen and wireless communication circuitry, cause the computer device to at least:

display, on the touch screen, a web page accessed via the wireless communication circuitry, the displayed web page including a link;

based on receiving a first touch input on the touch screen for the link on the displayed web page, perform a first operation; and based on receiving a second touch input, different from the first touch input, on the touch screen for the link on the displayed web page, perform a second operation, different from the first operation, wherein the first and second operations are performed based on no received inputs other than the respective first and second touch inputs on the touch screen.

16. The non-transitory computer-readable storage medium according to claim 15, wherein the first operation comprises displaying a web page corresponding to the link.

17. The non-transitory computer-readable storage medium according to claim 15, wherein the one or more programs further cause the computer device to:

selectively display a graphical interface element concurrently with the displayed web page, the graphical interface element including at least a first touch image operable for displaying a previous web page, a second touch image operable for displaying a next web page, a third touch image operable for accessing a process to display a bookmarked web page and a fourth touch image operable for accessing a process to bookmark a web page.

18. The non-transitory computer-readable storage medium according to claim 17, wherein the graphical interface element comprises a pop-up menu.

19. A computer device comprising:

a touch screen;

wireless communication circuitry;

one or more processors; and memory for storing a browser program for displaying web pages on the touch screen, wherein the one or more processors are configured to execute the browser program to control the computer device to at least:

display, on the touch screen, web pages accessed via the wireless communication circuitry;

based on a first swipe gesture input to the touch screen, display a next web page; and based on a second swipe gesture, different from the first swipe gesture, input to the touch screen, display a previous web page.

20. The computer device according to claim 19, wherein the one or more processors are configured to control the computer device to display a pop-up graphical interface element concurrently with a displayed web page.

21. The computer device according to claim 20, wherein the pop-up graphical interface element includes at least a first touch image operable for displaying the previous web page and a second touch image operable for displaying the next web page.

22. The computer device according to claim 21, wherein the pop-up graphical interface element further includes a third touch image operable for accessing a process to display a bookmarked web page and a fourth touch image operable for accessing a process to bookmark a web page.

23. The computer device according to claim 20, wherein the pop-up graphical interface element includes a touch image operable for accessing a process to input a uniform resource locator (URL).

24. The computer device according to claim 23, wherein the one or more processors are configured to control the computer device to display a keyboard on the touch screen operable for inputting the URL.

25. The computer device according to claim 20, wherein the pop-up graphical interface element includes a touch image operable for reloading a current web page.

26. The computer device according to claim 20, wherein the pop-up graphical interface element includes a touch image operable for stopping downloading of a current web page.

27. The computer device according to claim 19, wherein the one or more processors are configured to execute the browser based on selection of a corresponding icon displayed on the touch screen.

28. The computer device according to claim 19, implemented as a mobile telephone.

29. A non-transitory computer-readable storage medium storing one or more programs which, when executed by processing circuitry of a computer device comprising a touch screen and wireless communication circuitry, cause the computer device to at least:
    display, on the touch screen, web pages accessed via the wireless communication circuitry;
    based on a first swipe gesture input to the touch screen, display a next web page; and
    based on a second swipe gesture, different from the first swipe gesture, input to the touch screen, display a previous web page.

30. The non-transitory computer-readable storage medium according to claim 29, wherein the one or more programs further cause the computer device to display a pop-up graphical interface element concurrently with a displayed web page.

31. The non-transitory computer-readable storage medium according to claim 30, wherein the pop-up graphical interface element includes at least a first touch image operable for displaying the previous web page and a second touch image operable for displaying the next web page.

32. The non-transitory computer-readable storage medium according to claim 31, wherein the pop-up graphical interface element further includes a third touch image operable for accessing a process to display a bookmarked web page and a fourth touch image operable for accessing a process to bookmark a web page.

33. A method for a computer device including a touch screen, wireless communication circuitry, and memory for storing a browser program for displaying web pages on the touch screen, the method comprising:
    displaying, on the touch screen, a web page accessed via the wireless communication circuitry, the displayed web page including a link;
    based on receiving a first touch input on the touch screen for the link on the displayed web page, perform a first operation; and
    based on receiving a second touch input, different from the first touch input, on the touch screen for the link on the displayed web page, perform a second operation, different from the first operation,
    wherein the first and second operations are performed based on no received inputs other than the respective first and second touch screen inputs.

34. A computer device comprising:
    a touch screen;
    wireless communication circuitry;
    one or more processors; and
    memory for storing a browser program for displaying web pages on the touch screen, wherein the one or more processors are configured to execute the browser program to control the computer device to at least:
        display, on the touch screen, tabs associated with web pages currently opened on another display different from the touch screen; and
        based on a touch input to a first one of the tabs, display the web page associated with the first tab on the touch screen.

35. The computer device according to claim 34, wherein the one or more processors are configured to control the computer device to selectively display a graphical interface element concurrently with the displayed web page, the graphical interface element including at least a first touch image operable for displaying a previous web page, a second touch image operable for displaying a next web page, a third touch image operable for accessing a process to display a bookmarked web page and a fourth touch image operable for accessing a process to bookmark a web page.

36. The computer device according to claim 35, wherein the graphical interface element comprises a pop-up menu.

37. The computer device according to claim 35, wherein the first and second touch images comprise respective direction icons.

38. The computer device according to claim 35, wherein the third touch image is operable to cause display of a list of bookmarked web pages and the one or more processors are configured to control the computer device to access and display a bookmarked web page selected from the list in accordance with a selection input.

39. The computer device according to claim 34, wherein the one or more processors are configured to control the computer device to selectively display a graphical interface element concurrently with a displayed web page, the graphical interface element including a touch image operable for accessing a process to input a uniform resource locator (URL).

40. The computer device according to claim 39, wherein the one or more processors are configured to control the computer device to display a keyboard on the touch screen operable for inputting the URL.

41. The computer device according to claim 34, wherein the one or more processors are configured to control the computer device to selectively display a pop-up graphical interface element concurrently with a displayed web page, the pop-up graphical interface element including a touch image operable for reloading a current web page.

42. The computer device according to claim 34, wherein the one or more processors are configured to control the computer device to selectively display a pop-up graphical interface element concurrently with a displayed web page, the pop-up graphical interface element including a touch image operable for stopping downloading of a current web page.

43. The computer device according to claim 34, wherein the one or more processors are configured to control the computer device to zoom in/out on the displayed web page in response to respective zoom in/out gestures input to the touch screen.

44. The computer device according to claim 34, wherein the one or more processors are configured to control the computer device to scroll the displayed web page up/down in response to respective scroll up/down gestures input to the touch screen.

45. The computer device according to claim 34, implemented as a mobile telephone.

46. A non-transitory computer-readable storage medium storing one or more programs which, when executed by processing circuitry of a computer device comprising a touch screen and wireless communication circuitry, cause the computer device to at least:
- display, on the touch screen, tabs associated with web pages currently opened on another display different from the touch screen; and
- based on a touch input to a first one of the tabs, display the web page associated with the first tab on the touch screen.

* * * * *